United States Patent Office 2,834,779
Patented May 13, 1958

2,834,779
DISUBSTITUTED AMINOALKYL QUINUCLIDINIUM DERIVATIVES

John H. Biel and Alexander E. Drukker, Milwaukee, Wis., assignors to Lakeside Laboratories, Inc., a corporation of Wisconsin No Drawing. Application December 11, 1956
Serial No. 627,549

6 Claims. (Cl. 260—247.5)

This invention relates to the production of novel chemical compounds. More particularly, this invention is concerned with novel derivatives of quinuclidine and to compositions containing such derivatives.

According to the present invention there are provided novel quaternary ammonium salts of the formula

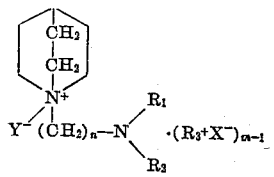

wherein $n$ is an integer from 2 through 10, $m$ is 1 or 2, $R_1$ and $R_2$ are the same or different groups such as alkyl groups, particularly lower alkyl groups like methyl, ethyl and propyl, aralkyl groups, particularly mononuclear aryl-lower alkyl groups including benzyl and phenethyl, aryl groups and particularly mononuclear aryl groups including phenyl and nuclear substituted phenyl groups, including o-chlorophenyl, p-methylphenyl and p-hydroxyphenyl, cycloalkyl groups and particularly cyclopentyl and cyclohexyl, tetrahydrofurfuryl, lower alkene groups such as the allyl group and groups in which $R_1$ and $R_2$ are joined to form a heterocyclic group with the nitrogen in a ring including both mononuclear and polynuclear structures such as pyrrolidino, piperidino, morpholino, 4-lower alkyl-1-piperazino, 1,2,3,4-tetrahydroquinolino, 1,2,3,4-tetrahydroisoquinolino, isoindolino, and 3-hydroxypiperidino and 4-hydroxypiperidino and ethers and esters thereof, $R_3$ is an alkyl group, particularly a lower alkyl group such as methyl, ethyl and the like, and aralkyl groups such as mononuclear aryl-lower alkyl groups particularly phenylmethyl, phenylethyl, and X and Y are the same or different non-toxic anions such as the halides, chloride, bromide and iodide, and anions like sulfate and benzenesulfonate.

As indicated above, monoquaternary and diquaternary aminoalkylene quinuclidinium derivatives are provided.

The monoquaternary derivatives may be conveniently produced by contacting quinuclidine with the appropriate disubstituted aminoalkylene halide, or corresponding compound in which the halide anion is replaced by a different non-toxic anion. This reaction may be represented as follows:

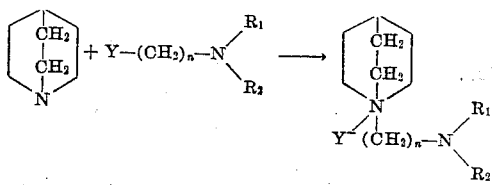

wherein $n$, Y, $R_1$ and $R_2$ have the significance previously assigned.

The diquaternary ammonium salts are formed by contacting quinuclidine with a trisubstituted ammonium alkylene halide, or corresponding compound in which the halide anion is replaced by a different non-toxic anion. This reaction may be represented as follows:

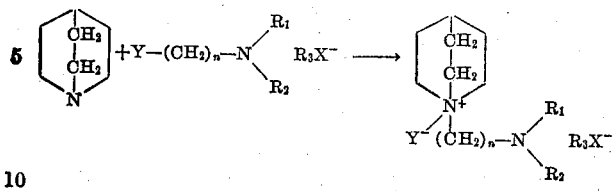

wherein $n$, X, Y, $R_1$, $R_2$ and $R_3$ have the significance previously assigned.

The quaternary ammonium salts are conveniently formed by effecting the reaction in the presence of a suitable organic solvent such as isopropyl alcohol or acetonitrile. Some of the salts form at room temperature while others require elevated temperatures such as the reflux temperature before reaction is achieved or quickly effected. The product may be recovered by filtration or evaporation of the solvent.

Representative compounds formed by these procedures are N-(3-diethylmethyl aminopropyl)-quinuclidinium dibromide, N-(6-diphenylaminohexyl)-quinuclidinium chloride, N-(8-morpholinooctyl)-quinuclidinium sulfate, N-(4-pyrrolidinobutyl)-quinuclidinium bromide, N-(2-piperidinoethyl)-quinuclidinium bromide, N-(3-N'-methylisoindolinoaminopropyl)-quinuclidinium dibromide, N-[6 - (N' - ethyl - 1,2,3,4 - tetrahydroisoquinolino) - hexyl] quinuclidinium disulfate and the like.

The mono- and di-quaternary ammonium salts are useful as hypotensive agents in lowering high blood pressure. The compounds of this invention act directly on the vasomotor centers of the mid-brain as well as by blocking ganglionic transmission. All the quaternary ammonium salts presently used in the treatment of hypertension are ganglionic blocking agents only. This limits their clinical usefulness because of the serious side effects which are inherent in this type of mechanism, such as blurred vision, intestinal atony, dry mouth, constipation, urinary retention, impotence and orthostatic hypotension.

The mono- and di-quaternary salts are high melting solids. They may be conveniently administered in the form of essentially pure undiluted compounds if desired, such as in a gelatin capsule. Because such compounds are highly active, however, administrable dosages of the pure compounds ordinarily do not possess a sufficiently large volume to be handled conveniently. There are, therefore, provided by this invention pharmaceutical compositions comprising a carrier and at least one of the non-toxic quaternary salts.

The compositions may be readily produced by intimately mixing one or more of the quaternary salts with a pharmaceutical carrier. The carrier may be either a liquid or a solid. When a liquid, it may form solutions or suspensions of the salts. Flavoring substances may be included as desired. Sterile water is the preferred liquid carrier; it readily dissolves the salts to form clear solutions. Isotonic solutions may be employed as parenteral injectable liquids.

Solid pharmaceutical carriers such as starch, sugar, talc and the like may be used to form powders. Such powders may be tableted by the use of suitable lubricants such as magnesium stearate, binders such as gelatin and disintegrating agents like sodium bicarbonate in combination with citric or tartaric acid. The powders may also be used to fill gelatin capsules.

Compositions of the types described may be produced having a wide variety of concentrations of one or more of the active quaternary ammonium salts. They may also be formed in unit-dosages containing predetermined amounts of active agents which may be administered one or more at a time at regular intervals of time to create and maintain effective body levels of the salt. One typical dosage in No. 3 hard gelatin capsules may be as follows:

| | Mg. |
|---|---|
| N-(3-diethylmethylaminopropyl)-quinuclidinium dibromide | 15 |
| Lactose | 200 |
| Starch | 16 |
| Talc | 8 |

The following examples are presented to show specific methods of producing certain of the novel salts.

EXAMPLE 1

*N-(3-diethylmethylaminopropyl)-quinuclidinium dibromide*

To 7.5 g. of quinuclidine in 100 cc. of acetonitrile was added 8 g. of diethylaminopropyl bromide methobromide dissolved in 100 cc. of acetonitrile. The mixture was refluxed for 20 hours and concentrated to a small volume. The precipitate was isolated by filtration and washed with ether; M. P. 255–256° C. Yield 9.0 g.

EXAMPLE 2

*N-(3-dimethylaminopropyl)-quinuclidinium iodide*

To 6.0 g. of crude quinuclidine dissolved in 25 cc. of acetonitrile was added a mixture containing 3.7 g. of dimethylaminoethyl chloride and 4.5 g. of sodium iodide in 100 cc. of acetonitrile. The reaction mixture was refluxed for 4.5 hours, clarified by filtration and the filtrate concentrated to 20 cc. It was necessary to add anhydrous ether to precipitate the product which was then recovered by filtration; M. P. 164–166° C. Yield 3.5 g.

*Analysis.*—Calcd. for $C_{12}H_{25}IN_2$: I, 39.15; N, 8.64. Found: I, 39.02; N, 8.20.

EXAMPLE 3

The following novel salts were also prepared by the described procedures from the appropriate reactants:

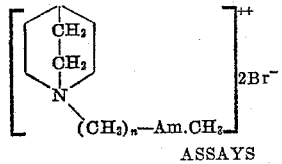

ASSAYS

| n | Am | M. P., °C. | Percent Bromide Calcd. | Percent Bromide Found | Percent Nitrogen Calcd. | Percent Nitrogen Found | Formula |
|---|---|---|---|---|---|---|---|
| 3 | N(CH₃)₂ | 292–293 | 42.93 | 42.55 | 7.53 | 7.38 | $C_{13}H_{28}Br_2N_2$ |
| 3 | ⟨N⟩ | 298 dec. | 40.11 | 39.61 | 7.00 | 7.00 | $C_{15}H_{30}Br_2N_2$ |
| 3 | ⟨O,N⟩ | 265–266 | 38.58 | 38.51 | 6.76 | 6.79 | $C_{15}H_{30}Br_2N_2O$ |
| 3 | ⟨N⟩ | 284–286 | 38.77 | 39.17 | 6.80 | 6.91 | $C_{16}H_{32}Br_2N_2$ |
| 5 | N(CH₃)₂ | 275–278 | 39.93 | 38.41 | 7.00 | 8.60 | $C_{15}H_{32}Br_2N_2$ |
| 2 | ⟨N⟩ | 349–352 | 41.60 | 40.80 | 7.29 | 7.23 | $C_{14}H_{28}Br_2N_2$ |

Various changes and modifications of the invention can be made and, to the extent that such variations incorporate the spirit of this invention, they are intended to be included within the scope of the appended claims.

What is claimed is:
1. N-(3-diethylmethylaminopropyl)-quinuclidinium dibromide.
2. N-(3-trimethylaminopropyl)-quinuclidinium dibromide.
3. N - (3 - pyrrolidinopropyl)-quinuclidinium bromide methobromide.
4. N - (3 - morpholinopropyl)-quinuclidinium bromide methobromide.
5. N - (3 - piperidinopropyl) - quinuclidinium bromide methobromide.
6. A compound of the formula

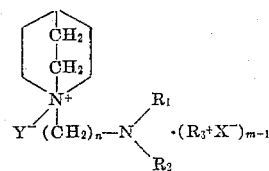

wherein n is an integer from 2 to 10, m is an integer no larger than 2, $R_1$ and $R_2$ are members of the group consisting of lower alkyl groups, phenyl, phenyl-lower alkyl groups, cyclohexyl, cyclopentyl, and groups in which

represents heterocyclic groups of the group consisting of pyrrolidino, piperidino, morpholino, 1,2,3,4-tetrahydroquinolino, 1,2,3,4-tetrahydroisoquinolino and isoindolino, $R_3$ is a member of the group consisting of lower alkyl and phenyl-lower alkyl groups, and X and Y are nontoxic anions.

No references cited.